(12) United States Patent
Mishali et al.

(10) Patent No.: US 8,032,085 B2
(45) Date of Patent: Oct. 4, 2011

(54) SPECTRUM-BLIND SAMPLING AND RECONSTRUCTION OF MULTI-BAND SIGNALS

(75) Inventors: Moshe Mishali, Haifa (IL); Eldar Yonina, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 925 days.

(21) Appl. No.: 12/018,361

(22) Filed: Jan. 23, 2008

(65) Prior Publication Data

US 2009/0068951 A1  Mar. 12, 2009

Related U.S. Application Data

(60) Provisional application No. 60/971,043, filed on Sep. 10, 2007.

(51) Int. Cl.
*H04B 7/00* (2006.01)
(52) U.S. Cl. ............... 455/59; 455/39; 455/62; 455/454; 370/203; 370/208; 370/210; 375/353; 375/354; 375/355
(58) Field of Classification Search ............. 455/39, 455/59, 62, 454, 168.1; 370/203, 208, 210; 375/353–355, 359
See application file for complete search history.

(56) References Cited

U.S. PATENT DOCUMENTS

| 2004/0264634 | A1 | 12/2004 | Claus et al. |
| 2005/0141603 | A1 | 6/2005 | Miller |
| 2005/0179585 | A1* | 8/2005 | Walker et al. ............ 342/134 |
| 2006/0009225 | A1* | 1/2006 | Herre et al. ............. 455/450 |
| 2006/0013597 | A1 | 1/2006 | Crivelli et al. |
| 2008/0129560 | A1* | 6/2008 | Baraniuk et al. ......... 341/87 |

FOREIGN PATENT DOCUMENTS
WO  2010/095083 A1  8/2010

OTHER PUBLICATIONS

National Semiconductor Corporation, "A/D Converter—Definition of terms", Jan. 2000.
Tropp, J.A., "Algorithms for simultaneous spare approximation. Part II: Convex relaxation", Special Issue on Sparse Approximations in Signal and Image Processing, vol. 86, issue 3, pp. 589-602, Mar. 2006.
"Wireless LAN Medium Access Control (MAC) and Physical Layer (PHY) specifications: High-speed physical layer in the 5 GHz band," IEEE Standard 802.11a, year 1999.
Zverev, A.I. "Handbook of Filter Synthesis", p. 13, John Wily & Sons 1967.

(Continued)

*Primary Examiner* — Tuan Pham
(74) *Attorney, Agent, or Firm* — D. Kliger I.P. Services Ltd.

(57) ABSTRACT

A signal processing method includes sampling an analog signal, which has a spectral density defining one or more bands, to produce a digitized signal. A spectral transform of the digitized signal is expressed as a matrix multiplied by a vector, wherein the vector includes multiple elements that represent the spectral density of the analog signal as a function of frequency within respective spectral slices. Indices of a subset of the elements of the vector, in which the spectral density is concentrated, is determined. The analog signal is reconstructed from the digitized signal using the subset of the elements of the vector and a corresponding subset of columns of the matrix having the indices.

31 Claims, 5 Drawing Sheets

OTHER PUBLICATIONS

Viterbi, A.J., "CDMA principles of spread spectrum communication," Addison-Wesly Wireless Communications Series, 1995.

Kohlenberg, A., "Exact interpolation of band-limited functions", Journal of Applied Physics, vol. 24, No. 12, pp. 1432-1435, Dec. 1953.

Dickson et al., "An 80-Gb/s 231—1 pseudorandom binary sequence generator in SiGe BiCMOS technology", IEEE Journal on Solid-State Circuits, vol. 40, No. 12, pp. 2735-2745, Dec. 2005.

Razavi, B., "A 60-GHz CMOS receiver front-end", IEEE Journal of Solid-State Circuits, vol. 41, No. 1, pp. 17-22, Jan. 2006.

Shannon, C.E., "Communication in the presence of noise", Proceeding of IRE, vol. 86, No. 2, pp. 447-457, Feb. 1998 (reprinted from IRE proceedings vol. 37, pp. 10-21, 1949).

Hedge et al., "Random projections for manifold learning", Advances in Neural Information Processing Systems 20, pp. 641-648, year 2008.

Herley et al., "Minimum rate sampling and reconstruction of signals with arbitrary frequency support", IEEE Transactions on Information Theory, vol. 45, No. 5, pp. 1555-1564, Jul. 1999.

Kienmayer et al., "A low-power low-voltage NMOS bulk-mixer with 20 GHz bandwidth in 90 nm CMOS", Proceedings of the 2004 International Symposium on Circuits and Systems, vol. 4, Vancouver, Canada, May 23-26, 2004.

Wang et al., "A background timing-skew calibration technique for time-interleaved analog-to-digital converters", IEEE Transactions on Circuits & Systems—II: Express Briefs, vol. 53, No. 4, pp. 299-303, Apr. 2006.

Donoho et al., "Optimally sparse representation in general (nonorthogonal) dictionaries via l1 minimization", Proceedings of the National Academy of Science of USA, vol. 100, No. 4, pp. 2197-2202, Mar. 4, 2003.

Donoho, D.L., "Compressed sensing", IEEE Transactions on Information Theory, vol. 52, No. 4, pp. 1289-1306, Apr. 2006.

Candes et al., "Robust uncertainty principles: Exact signal reconstruction from highly incomplete frequency information", IEEE Transactions on Information Theory, vol. 52, No. 2, pp. 489-509, Feb. 2006.

Laskin et al., "A 60 mW per Lane, 4 × 23-Gb/s 27-1 PRBS Generator", IEEE Journal on Solid-State Circuits, vol. 41, No. 10, pp. 2198-2208, Oct. 2006.

Gardner, F., "Properties of frequency difference detectors", IEEE Transactions on Communications, vol. 33, No. 2, pp. 131-138, Feb. 1985.

Landau, H.J., "Necessary density conditions for sampling and interpolation of certain entire functions", Acta Mathematica, vol. 177, No. 1, pp. 37-52, Feb. 1967.

Johansson et al., "Reconstruction of nonuniformly sampled bandlimited signals by means of digital fractional delay filters", IEEE Transactions on Signal Processing, vol. 50, No. 11, pp. 2757-2767, Nov. 2002.

Nyquist, H., "Certain Topics in Telegraph Transmission Theory", Proceedings of the IEEE, vol. 90, No. 2, pp. 280-305, Feb. 2002 (reprinted from Transactions of A.I.E.E, vol. 47, No. 2, pp. 617-644, Apr. 1928).

Friis, H. T., "Noise figures of radio receivers", Proceedings of the IRE, vol. 32, No. 7, pp. 419-422, Jul. 1944.

Tropp, J. A., "Algorithms for simultaneous spare approximation. Part I: Greedy pursuit", Special Issue on Sparse Approximations in Signal and Image Processing, vol. 86, pp. 572-588, Apr. 2006.

Chen et al., "Theoretical results on sparse representations of multiple-measurement vectors", IEEE Transactions on Signal Processing, vol. 54, No. 12, pp. 4634-4643, Dec. 2006.

Crols et al., "Low-IF topologies for high-performance analog front ends of fully integrated receivers", IEEE Transactions on Circuits & Systems—I: Analog and Digital Signal Processing, vol. 45, No. 3, pp. 269-282, Mar. 1998.

Elbornsson et al., "Blind equalization of time errors in a time-interleaved ADC system", IEEE Transactions on Signal Processing, vol. 53, No. 4, pp. 1413-1424, Apr. 2005.

Laska et al., "Theory and implementation of an analog-to-information converter using random demodulation", IEEE Proceedings of International Symposium on Circuits and Systems, pp. 1959-1962, New Orleans, USA, May 27-30, 2007.

Le et al., "Analog-to-digital converters", IEEE Signal Processing Magazine, vol. 22, No. 6, pp. 69-77, Nov. 2005.

Cotter et al., "Sparse solutions to linear inverse problems with multiple measurement vectors", IEEE Transactions on Signal Processing, vol. 53, No. 7, pp. 2477-2488, Jul. 2005.

Venkataramani et al., "Perfect reconstruction formulas and bounds on aliasing error in sub-Nyquist nonuniform sampling of multiband signals", IEEE Transactions on Information Theory, vol. 46, No. 6, pp. 2173-2183, Sep. 2000.

Unser, M., "Sampling—50 years after Shannon", Proceedings of the IEEE, vol. 88, No. 4, pp. 569-587, Apr. 2000.

Vetterli et al., "Sampling signals with finite rate of innovation", IEEE Transactions on Signal Processing, vol. 50, No. 6, pp. 1417-1428, Jun. 2002.

Mitoja, J., "Cognitive radio for flexible mobile multimedia communications", Mobile Networks and Applications, vol. 6, issue 5, pp. 435-441, Sep. 2001.

Alon et al., "Simple construction of almost k-wise independent random variables", Proceedings of the 31st Annual Symposium on Foundations of Computer Science, vol. 2, pp. 554-553, St. Louis, USA, Oct. 22-24, 1990.

Carvalho et al., "Compact formulas to relate ACPR and NPR to two-tone IMR and IP3", Microwave Journal, vol. 42, No. 12, Dec. 1999.

Boutin et al., "An arctangent type wideband PM/FM demodulator with improved performances", Proceedings of the 33rd Midwest Symposium on Circuits and Systems, pp. 460-463, Calgary, Canada, Aug. 12-14, 1990.

Feng et al., "Spectrum-blind minimum-rate sampling and reconstruction of multiband signals", Proceedings of IEEE International Conference on ASSP, vol. 2, pp. 1688-1691, May 1996.

Vaidyanathan et al., "Generalizations of the sampling theorem: Seven decades after Nyquist", IEEE Transactions on Circuits & Systems—I: Fundamental Theory and Applications, vol. 48, No. 9, pp. 1094-1109, Sep. 2001.

Welch et al., "The use of fast Fourier transform for the estimation of power spectra: A method based on time averaging over short, modified periodograms", IEEE Transactions on Audio and Electroacoustics, vol. 15, No. 2, pp. 70-73, Jun. 1967.

Baraniuk et al., "A simple proof of the restricted isometry property for random matrices," Constructive Approximation, Jan. 18, 2007.

Chen et al., "Atomic decomposition by basis pursuit", SIAM Review, vol. 43, No. 1, pp. 129-159, year 2001 (published originally in SIAM Journal on Scientific Computing, vol. 20, No. 1, pp. 33-61, Aug. 1998).

Huang et al., "Blind calibration of timing offsets for four—channel time—interleaved ADCs", IEEE Transactions on Circuits & Systems—I: Regular papers, vol. 54, No. 4, pp. 863-876, Apr. 2007.

Vaughan et al., "The theory of bandpass sampling", IEEE Transactions on Signal Processing, vol. 39, No. 9, pp. 1973-1984, Sep. 1991.

Walden, R.H., "Analog-to-digital converter survey and analysis", IEEE Journal on Selected Areas in Communication, vol. 17, No. 4, pp. 539-550, Apr. 1999.

Pickoltz et al., "Theory of Spread-Spectrum Communications—A Tutorial", IEEE Transactions on Communications, vol. 30, No. 5, pp. 855-884, May 1982.

Kotelnikov, V.A., "On the transmission capacity of 'ether' and wire in electrocommunications", Proceedings of the first All-Union Conference on the technological reconstruction of the communications sector and the development of low-current engineering, Moscow, Russia, 1933.

Black et al., "Time interleaved converter arrays", IEEE International Conference on Solid-State Circuits, vol. XXIII, pp. 14-15 & 254, Feb. 13, 1980.

Eldar et al., "Filter bank reconstruction of bandlimited signals from nonuniform and generalized samples," IEEE Transactions on Signal Processing, vol. 48, No. 10, pp. 2864-2875, Oct. 2000.

Eldar et al., "A minimum squared-error framework for generalized sampling", IEEE Transactions on Signal Processing, vol. 54, No. 6, pp. 2155-2167, Jun. 2006.

Jeng, Y.C., "Digital spectra of nonuniformly sampled signals: a robust sampling time offset estimation algorithm for ultra high-speed waveform digitizers using interleaving", IEEE Transactions on Instrumentation & Measurement, vol. 39, No. 1, pp. 71-75, Feb. 1990.

Lin et al., "Periodically nonuniform sampling of bandpass signals", IEEE Transactions on Circuits & Systems—II: Analog & Digital Signal Processing, vol. 45, No. 3, pp. 340-351, Mar. 1998.

Tian et al., "Compressed sensing for wideband cognitive radios", IEEE Conference on Acoustics, Speech & Signal Processing, vol. 4, pp. IV1357-IV1360, Honolulu, USA, Apr. 15-20, 2007.

Davis et al., "Adaptive Greedy Approximations", Journal on Constructive Approximation, vol. 13, No. 1, pp. 57-98, year 1997.

Candes et al., "Decoding by Linear Programming", IEEE Transactions on Information Theory, vol. 51, No. 12, pp. 4203-4215, Dec. 2005.

Kruskal, J.B., "Three-way Arrays: rank and uniqueness of trilinear decompositions, with application to arithmetic complexity and statistics", Linear Algebra and its Applications, vol. 18, issue 2, pp. 95-138, year 1977.

Mondillo et al., "Handheld echocardiography: its use and usefulness", International Journal of cardiology, vol. 111, No. 1, pp. 1-5, year 2006.

Tropp et al., "Random Filters for Compressive Sampling and Reconstruction", IEEE International Conference on Acoustics, Speech and Signal Processing, pp. III872-III875, Toulouse, France, May 2006.

Unser et al., "A General Sampling Theory for Nonideal Acquisition Devices", IEEE Transactions on Signal Processing, vol. 42, No. 11, pp. 2915-2925, Nov. 1994.

Aldroubi et al., "Nonuniform Sampling and Reconstruction in Shift-Invariant Spaces", SIAM Journal, vol. 43, issue 4, pp. 585-620, Mar. 2001.

Eldar et al., "Nonideal Sampling and Interpolation From Noisy Observations in Shift-Invariant Spaces", IEEE Transactions on Signal Processing, vol. 54, No. 7, pp. 2636-2651, Jul. 2006.

Hou et al., "A new method for high resolution estimation of time delay", IEEE International Conference on Acoustics, Speech and Signal Processing, vol. 7, pp. 420-423, May 1982.

Senior et al., "Portable echocardiography: a review", British Journal of cardiology, vol. 13, No. 3, pp. 185-189, May/Jun. 2006.

Bienvenu et al., "Adaptivity to background noise spatial coherence for high resolution passive methods", IEEE International Conferences on Acoustics, Speech and Signal Processing, vol. 05, pp. 307-310, Apr. 1980.

Unser, M., "Splines: A Perfect Fit for Signal and Image Processing", IEEE Signal Processing Magazine, vol. 16, No. 6, pp. 22-38, Nov. 1999.

Unser et al., "Cardinal Exponential Splines: Part I—Theory and Filtering Algorithms", IEEE Transactions on Signal Processing, vol. 53, No. 4, pp. 1425-1438, Apr. 2005.

Maravic et al., "Sampling and reconstructions of signals with finite rate of innovation in the presence of noise", IEEE Transactions on Signal Processing, vol. 53, No. 8, pp. 2788-2805, Aug. 2005.

Kusuma et al., "Multichannel Sampling of Parametric Signals with a Successive Approximation Property", IEEE International Conference in Image Processing, pp. 1265-1268, Oct. 2006.

Shan et al., "On Spatial Smoothing for direction-of-arrival estimation of coherent signals", IEEE Transactions on Acoustics, Speech and Signal Processing, vol. 33, No. 4, pp. 806-811, Aug. 1985.

Bresler et al., "Spectrum-blind minimum rate sampling and reconstruction of 2-D multi-band signals", IEEE International Conference on Image Processing, vol. 1, pp. 701-704, Switzerland, Sep. 1996.

Benedetto et al., "Gabor Systems and the balian-low theorem", Gabor Analysis and Algorithms: Theory and Applications, pp. 85-122, year 1998.

Feichtinger et al., "A Banach space of test functions for gabor analysis", Gabor Analysis and Algorithms: Theory and Applications, p. 123-170, year 1998.

Daubechies et al., "Painless nonorthogonal expansions", Journal of Mathematical Physics, vol. 27, No. 5, year 1986.

Christensen et al., "Pairs of dual gabor frame generators with compact support and desired frequency localization", Applied and Computational Harmonic Analysis, vol. 20, No. 3, pp. 403-410, May 2006.

Candes et al., "Near Optimal Signal Recovery from random projections: universal encoding strategies?", IEEE information Theory, vol. 52, No. 12, pp. 5406-5425, Dec. 2006.

Rudelson et al., "On Sparse Reconstruction from Fourier and Gaussian Measurements", Communications on Pure and Applied Mathematics, vol. 61, issue 8, pp. 1025-1045, year 2008.

Ron et al., "Frames and stable bases for shift-invariant subspaces of L2(Rd)", Canadian Journal of Mathematics, vol. 47, No. 5, pp. 1051-1094, year 1995.

Prete, V.D., "Estimates, decay properties, and computation of the dual function for gabor frames", Journal of Fourier Analysis and Applications, vol. 5, No. 6, pp. 545-562, year 1999.

Grochenig et al., "Note on b-slines, wavelet scaling functions, and gabor games", IEEE Transactions on Information Theory, vol. 49, No. 12, pp. 3318-3320, Dec. 2003.

Folland et al., "The uncertainty principle: a mathematical survey", Journal of Fourier Analysis and Applications, vol. 3, No. 3, pp. 207-238, year 1997.

Butzer et al., "A sampling theorem for duration-limited functions with error estimates", Information and Control, vol. 34, issue 1, pp. 55-65, May 1977.

Butzer et al., "Sampling theory for not necessarily band-limited functions: a historical overview", SIAM review, vol. 34, No. 1, pp. 40-53, Mar. 1992.

Grochenig, K., "Foundations of Time—Frequency Analysis", chapter 3.1 (pp. 36-41) and chapter 5.2 (pp. 92-97, year 2001.

Dragotti et al., "Sampling moments and reconstructing signals of finite rate of innovation: Shannon meets strang-fix", IEEE Transactions on Signal Processing, vol. 55, No. 5, pp. 1741-1757, May 2007.

Hua et al., "Matrix pencil method for estimating parameters of exponentially damped/undamped sinusoids in noise", IEEE Transactions on Acoustics, Speech and Signal Processing, vol. 38, No. 5, pp. 814-824, May 1990.

Kumaresan et al., "Estimating the angles of arrival of multiple plane waves", IEEE Transactions on Aerospace Electronic System, vol. AES19, No. 1, pp. 134-139, Jan. 1983.

Roy et al., "ESPRIT-estimation of signal parameters via rotational invariance techniques", IEEE Transactions on Acoustics, Speech and Signal Processing, vol. 37, No. 7, pp. 984-995, Jul. 1989.

Schmidt, E., "Multiple emitter location and signal parameter estimation", IEEE Transactions on Antennas & Propagation, vol. AP-34, No. 3, pp. 276-280, Mar. 1986.

International Application PCT/IB2010/050661 Search Report dated Jul. 15, 2010.

U.S. Appl. No. 13/041,455, filed Mar. 7, 2011.

PCT Application PCT/IB2011/051449 filed Apr. 5, 2011.

U.S. Appl. No. 61/392,671, filed Oct. 13, 2010.

* cited by examiner

SPECTRUM-BLIND SAMPLING AND RECONSTRUCTION OF MULTI-BAND SIGNALS

CROSS-REFERENCE TO RELATED APPLICATIONS

This application claims the benefit of U.S. Provisional Patent Application 60/971,043, filed Sep. 10, 2007, whose disclosure is incorporated herein by reference.

FIELD OF THE INVENTION

The present invention relates generally to signal processing, and particularly to methods and systems for sampling and reconstruction of multi-band signals.

BACKGROUND OF THE INVENTION

Reception and reconstruction of analog signals are performed in a wide variety of applications, including wireless communication systems, spectrum management applications, radar systems, medical imaging systems and many others. In many of these applications, an information-carrying analog signal is sampled, i.e., converted into digital samples. The information is then reconstructed by processing the digital samples.

The minimum sampling rate needed for perfect reconstruction of an arbitrary sampling method was established by Landau in "Necessary Density Conditions for Sampling and Interpolation of Certain Entire Functions," Acta Mathematica, volume 17, number 1, July, 1967, pages 37-52, which is incorporated herein by reference.

Various methods for signal sampling and reconstruction are known in the art. Some sampling and reconstruction methods refer to bandpass or band-limited signals, and in particular to multi-band signals, i.e., signals that are confined to a finite set of spectral bands. Methods for sampling bandpass signals are described, for example, by Vaughan et al. in "The Theory of Bandpass Sampling," IEEE Transactions on Signal Processing, volume 39, September, 1991, pages 1973-1984, and by Kohlenberg in "Exact Interpolation of Band-Limited Functions," Journal of Applied Physics, volume 24, December, 1953, pages 1432-1435, which are incorporated herein by reference.

Lin and Vaidyanathan describe methods for periodic non-uniform sampling of multi-band signals in "Periodically Non-Uniform Sampling of Bandpass Signals," IEEE Transactions on Circuits and Systems II, volume 45, number 3, March, 1998, pages 340-351, which is incorporated herein by reference. Methods for sampling and reconstruction of multi-band signals are also described by Herley and Wong in "Minimum Rate Sampling and Reconstruction of Signals with Arbitrary Frequency Support," IEEE Transactions on Information Theory, volume 45, July, 1999, pages 1555-1564, and by Venkataramani and Bresler in "Perfect reconstruction Formulas and Bounds on Aliasing Error in Sub-Nyquist Nonuniform Sampling of Multiband Signals," IEEE Transactions on Information Theory, volume 46, September, 2000, pages 2173-2183, which are incorporated herein by reference.

Additional methods for sampling and reconstruction of multi-band signals are described by Feng and Bresler in "Spectrum-Blind Minimum-Rate Sampling and Reconstruction of Multiband Signals," Proceedings of the IEEE International Conference on Acoustics, Speech and Signal Processing (ASSP), May 7-10, 1996, Atlanta, Ga., and by Bresler and Feng in "Spectrum-Blind Minimum-Rate Sampling and Reconstruction of 2-D Multiband Signals," Proceedings of the IEEE International Conference on Image Processing, Lausanne, Switzerland, Sep. 16-19, 1996, which are incorporated herein by reference.

SUMMARY OF THE INVENTION

Embodiments of the present invention provide a signal processing method, including:

sampling an analog signal, which has a spectral density defining one or more bands, to produce a digitized signal;

expressing a spectral transform of the digitized signal as a matrix multiplied by a vector, wherein the vector includes multiple elements that represent the spectral density of the analog signal as a function of frequency within respective spectral slices;

determining indices of a subset of the elements of the vector in which the spectral density is concentrated; and reconstructing the analog signal from the digitized signal using the subset of the elements of the vector and a corresponding subset of columns of the matrix having the indices.

In some embodiments, sampling and reconstructing the analog signal are carried out irrespective of frequencies of the one or more bands. Sampling the analog signal may include sampling the signal using a periodic, non-uniform sampling pattern.

In an embodiment, determining the indices includes integrating the spectral transform of the digitized signal multiplied by a complex conjugate of the spectral transform to produce an integrated matrix, decomposing the integrated matrix, expressing the decomposed integrated matrix as the matrix multiplied by another matrix, determining a sparsest solution of the another matrix, and extracting the indices of the sparsest solution to serve as the indices of the subset of the elements of the vector.

Determining the sparsest solution typically includes applying a Multiple Measurement Vector (MMV) process. In an embodiment, determining the indices includes determining an indication that the sparsest solution could not be found and, responsively to the indication, splitting a sampling interval used for sampling the analog signal into sub-intervals, determining the indices separately within each of the sub-intervals, and combining the indices determined within each of the sub-intervals to produce the indices.

In another embodiment, determining the indices includes determining a set of components such that a sum of the components produces the integrated matrix, determining the indices separately for each of the components, and combining the indices determined for each of the components to produce the indices. In yet another embodiment, integrating the spectral transform includes defining a set of digital filters, and filtering the digitized signal using the set of the digital filters to produce the integrated matrix. Alternatively, integrating the spectral transform includes directly processing the digitized signal to produce the integrated matrix. In some embodiment, the method includes pre-processing the integrated matrix prior to decomposing the integrated matrix.

In a disclosed embodiment, reconstructing the analog signal includes determining and outputting frequencies of the one or more bands. In some embodiments, the analog signal includes a communication signal carrying multiple communication channels, and reconstructing the analog signal includes decoding the communication channels. The analog signal may include one of a radar signal, a medical imaging signal, a radio signal, an acoustic echo signal, a speech signal and an image signal. In some embodiments, the method includes recording the digitized signal for later use, and reconstructing the analog signal includes processing the recorded digitized signal.

There is additionally provided, in accordance with an embodiment of the present invention, a signal processing apparatus, including:

a sampling module, which is coupled to sample an analog signal, which has a spectral density defining one or more bands, to produce a digitized signal; and a reconstruction module, which is coupled to express a spectral transform of the digitized signal as a matrix multiplied by a vector, wherein the vector includes multiple elements that represent the spectral density of the analog signal as a function of frequency within respective spectral slices, to determine indices of a subset of the elements of the vector in which the spectral density is concentrated, and to reconstruct the analog signal from the digitized signal using the subset of the elements of the vector and a corresponding subset of columns of the matrix having the indices.

There is further provided, in accordance with an embodiment of the present invention, a computer software product for signal processing, the product including a computer-readable medium, in which program instructions are stored, which instructions, when read by a processor, cause the processor to sample an analog signal, which has a spectral density defining one or more bands, so as to produce a digitized signal, to express a spectral transform of the digitized signal as a matrix multiplied by a vector, wherein the vector includes multiple elements that represent the spectral density of the analog signal as a function of frequency within respective spectral slices, to determine indices of a subset of the elements of the vector in which the spectral density is concentrated, and to reconstruct the analog signal from the digitized signal using the subset of the elements of the vector and a corresponding subset of columns of the matrix having the indices.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for sampling and reconstruction of multi-band analog signals. Unlike some known sampling and reconstruction methods, the methods and systems described herein are spectrum-blind. In other words, both sampling and reconstruction are carried out irrespective of any prior knowledge regarding the frequencies of the signal spectral bands.

In some embodiments that are described hereinbelow, a multi-band analog signal x(t) is sampled, typically using periodic, non-uniform sampling, to produce a digitized signal. A matrix equation is constructed, in which the Discrete-Time Fourier Transform (DTFT) of the digitized signal is expressed as a product of a matrix (denoted A) by an unknown vector (denoted x(f), wherein f denotes frequency). The vector x(f) comprises multiple elements, with each element representing a certain spectral slice of the spectral density of the analog signal. The problem of recovering x(t) from the digitized signal is thus converted to the equivalent problem of solving the matrix equation for x(f).

The matrix equation has two notable characteristics: (1) it comprises a continuous infinite set of linear systems, because of the continuous variable f, and (2) it does not have a single unique solution, but rather an entire subspace of solutions. The methods and systems described herein first reduce the infinite set of linear systems to a finite one using a process referred to as Continuous-To-Finite (CTF) conversion, which is described in detail below. The output of this reduction is then used to produce a single unique solution for x(f).

The CTF conversion process makes use of the fact that vector x(f) is sparse, i.e., has a relatively small number of non-zero elements. The process automatically identifies the indices of a subset of the elements of x(f) containing non-negligible spectral density (referred to as non-zero elements). Then, the matrix equation is reduced to include only the non-zero elements of x(f) and the corresponding columns of matrix A, which multiply the non-zero elements. The reduced matrix equation, which is now finite and does have a unique solution, is solved to reproduce x(f).

Several exemplary CTF processes are described below, along with simulated test results that demonstrate the performance of these processes when applied to various signals and sampling schemes. Several alternative performance trade-offs, which trade sampling rate for computational complexity, are discussed.

The spectrum-blind methods described herein can be used in a wide variety of applications that involve reception of multi-band signals, such as in wireless communication, software-defined radio, cognitive radio, analysis of radar signals, spectrum monitoring and management, electronic intelligence, medical imaging applications and many others. Several exemplary applications are described below.

Multi-Band Signals

Multi-band signals are band-limited signals, whose spectral density is concentrated in a finite set of spectral bands. Multi-band signals are encountered in a variety of applications, such as in wireless communication systems that transmit and receive over multiple narrowband channels, in multi-carrier modulation systems and many others.

Figure 1:
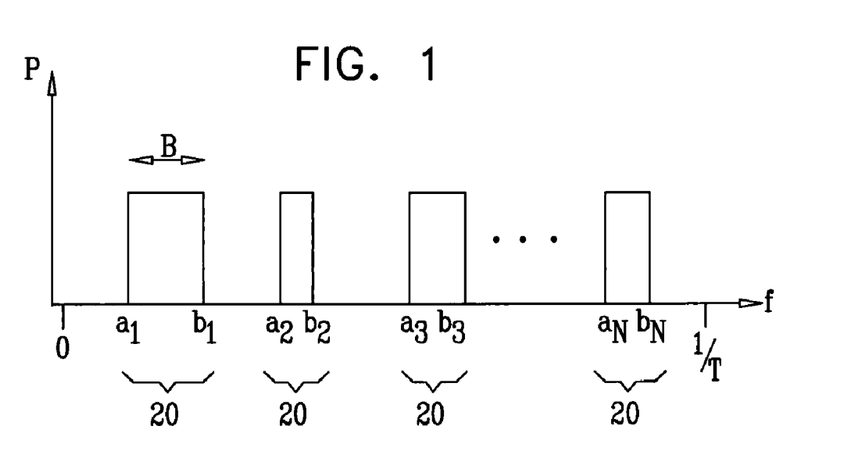
FIG. 1 is a diagram that schematically illustrates a spectrum of a multi-band signal, in accordance with an embodiment of the present invention.

FIG. 1 is a diagram that schematically illustrates a spectrum of a multi-band signal denoted x, in accordance with an embodiment of the present invention. In the present example, the signal is represented as a complex signal and occupies N spectral bands 20 within the range [0,1/T]. The Nyquist frequency for this signal is thus 1/T.

The lower and upper band edges of the $i^{th}$ band are denoted $a_i$ and $b_i$, respectively. Bands 20 may have any suitable bandwidth and may be located anywhere within the range [0,1/T]. The bandwidth of the broadest band is denoted B. The union of bands 20 is sometimes referred to as the spectral support of the signal. The set of all complex-valued multi-band signals confined to the range [0,1/T] and having no more than N bands is denoted M.

In the embodiments described herein, the entire spectral response of the multi-band signal is confined to the N bands, and no energy falls outside these bands. However, the methods and systems described herein can also be used with signals in which a small fraction of the signal energy falls outside the bands. Such signals are also regarded herein as multi-band signals.

Although the description that follows mainly addresses complex signal representation, this choice is made purely for the sake of clarity. The methods and systems described herein can be adapted in a straightforward manner and used with real-valued signals in the range [−1/2T, 1/2T], as will be shown further below.

The methods and systems described herein sample the time-domain signal x(t) at a rate that is lower than its Nyquist rate, and reconstruct the information conveyed by the analog signal from the sampled signal. Both sampling and reconstruction are performed without any prior knowledge or assumptions as to the locations of the spectral bands it occupies. This property is referred to as "spectrum-blind" sampling and reconstruction.

Although applicable to a wide variety of signal types, the methods and systems described herein are particularly advantageous for sampling and reconstructing sparse multi-band signals, in which the cumulative bandwidth of the signal bands is small with respect to the size of the range [0,1/T].

Non-Uniform Sampling

The methods described herein sample the analog multi-band signal in a non-uniform sampling pattern, whose average rate is significantly lower than the Nyquist rate of the signal. The examples described herein employ periodic non-uniform patterns, although any other suitable form of reduced-rate sampling can also be used.

Figure 2:
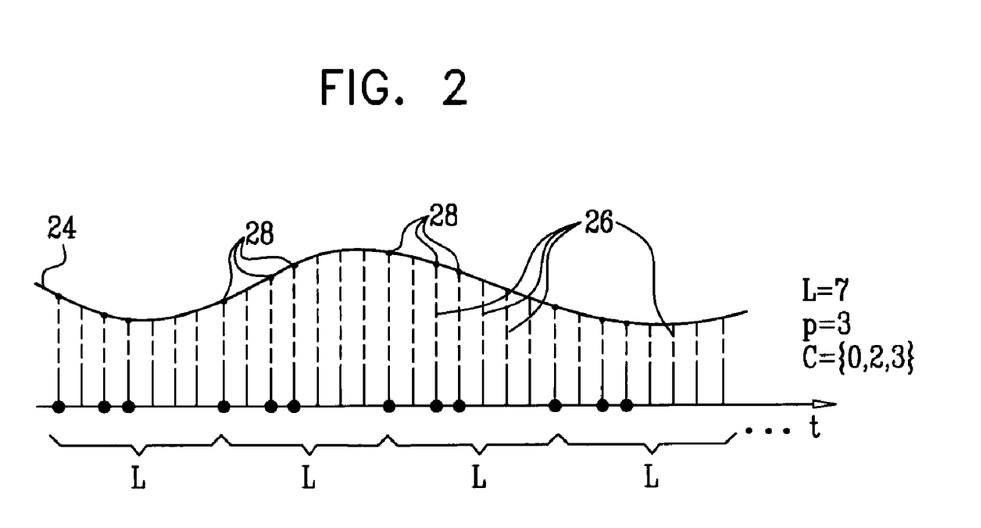
FIG. 2 is a diagram that schematically illustrates a scheme for non-uniform sampling of a signal, in accordance with an embodiment of the present invention.

FIG. 2 is a diagram that schematically illustrates a scheme for non-uniform sampling of an analog signal 24, in accordance with an embodiment of the present invention. In the present example, the time axis is divided into sampling points 26 spaced at T intervals i.e., intervals that would sample the signal at its Nyquist rate.

Sampling points 26 are grouped in groups of L points. Within each group of L potential sampling points, only p samples 28, selected in accordance with a predetermined set of indices, are actually sampled. In the present example, the time axis is divided into groups of seven sampling points each (L=7), and only three samples are produced within each group (p=3). The set of indices of the p samples is referred to as the sampling pattern, and is denoted $C=\{c_i\}_{i=1}^{p}$. In the present example, c={0, 2, 3}. The average sampling rate when using such a scheme is $$\frac{1}{T_{AVG}} = \frac{p}{LT} \quad [1]$$

which is lower than the Nyquist rate for p<L.

Sampling using this sort of periodic pattern can be viewed as sampling the signal using p sequences having a rate of 1/LT, wherein the $i^{th}$ sequence is shifted from the origin by $c_i T$. The signal sampled by the $i^{th}$ sequence is given by $$x_{c_i}[n] = \begin{cases} x(t = nT) & n = mL + c_i, \text{ for some } m \in Z \\ 0 & \text{otherwise} \end{cases} \quad [2]$$

Thus, the sampling scheme is uniquely characterized by the parameters L, p and the pattern C.

It can be shown that the Discrete-Time Fourier Transform (DTFT) of $x_{c_i}[n]$ can be written as $$X_{c_i}(e^{j2\pi fT}) = \frac{1}{LT} \sum_{r=0}^{L-1} \exp\left(j\frac{2\pi}{L}c_i r\right) X\left(f + \frac{r}{LT}\right) \quad [3]$$

$$\forall f \in F_0 = \left[0, \frac{1}{LT}\right), 1 \le i \le p$$

Equation [3] above can be represented in matrix notation as $$y(f) = Ax(f), \forall f \in F_0 \quad [4]$$

wherein y(f) is a vector of length p whose $i^{th}$ element is $X_{c_i}(e^{j2\pi fT})$, the DTFT of the sampling sequences. Vector x(f) is a vector of length L, whose elements are given by $$x_i(f) = X\left(f + \frac{i}{LT}\right), 0 \le i \le L-1, f \in F_0 \quad [5]$$

Thus, vector x(f) contains L unknowns for each value of f, which should be determined in order to reconstruct the signal. Each element $x_i(f)$ of vector x(f) comprises a segment of the spectral density function X(f), within a certain spectral slice of the spectral range [0,1/T]. The structure of vector x(f) is demonstrated in FIG. 3 below.

Figure 3:
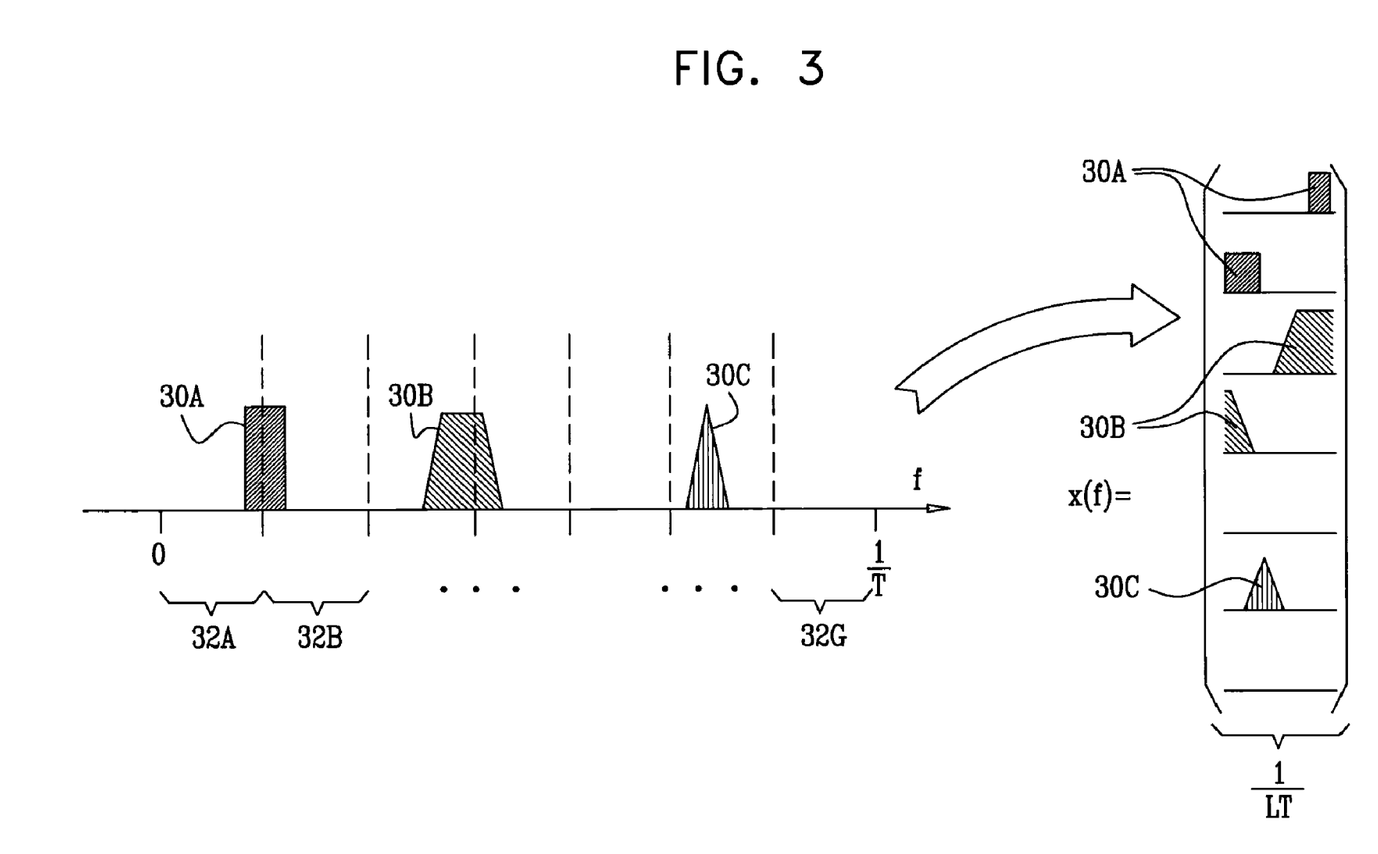
FIG. 3 is a diagram that schematically illustrates a vector representation of the spectrum of a multi-band signal, in accordance with an embodiment of the present invention.

FIG. 3 is a diagram that schematically illustrates a vector representation of the spectrum (spectral density) of a multi-band signal, in accordance with an embodiment of the present invention. In the present example, the signal comprises three bands 30A . . . 30C. The spectral range [0,1/T] is divided into L=7 spectral slices 32A . . . 32G. Each spectral slice forms a corresponding element of vector x(f). Since the method does not assume any prior knowledge of the signal band locations, slices 32A . . . 32G are not coordinated with bands 30A . . . 30C. As can be seen in the figure, a certain signal band (e.g., bands 30A and 30B) may contribute to two or more elements of x(f). Band 30C happened to fall in a single element of x(f).

Matrix A in Equation [4] above is a constant rectangular matrix having p rows and L columns, which depends on the choice of L, p and the sampling pattern C, but does not depend on the signal x(t). The elements of Matrix A are given by $$A_{ik} = \frac{1}{LT} \exp\left(j\frac{2\pi}{L}c_i k\right) \quad [6]$$

To summarize this part of the description, Equation [4] above translates the task of sampling and reconstructing signal x(t) to the equivalent task of reconstructing x(f) from the known y(f) and A, for all $$f \in \left[0, \frac{1}{LT}\right].$$

Spectrum-Blind Sampling and Reconstruction

The task of recovering x(f) from y(f) and A for all f, as formulated by the equation system of Equation [4] above, has two properties that are of major significance:

1. Equation [4] comprises a continuous infinite set of linear systems, because of the continuous variable f.
2. The equation system of Equation [4] is not unique, i.e., it does not have a single unique solution but an entire subspace of solutions. In other words, Matrix A has more columns than rows and cannot be readily inverted to produce x(f).

The methods described below reduce the infinite set of linear systems to a finite one using a process referred to as Continuous-To-Finite (CTF) conversion. The output of this reduction is then used to produce a single unique solution for x(f). The CTF conversion process makes use of the fact that vector x(f) is sparse, i.e., has a relatively small number of non-zero elements.

Referring to the example of FIG. 3, it is recalled that the $i^{th}$ element of x(f) comprises the spectral density of the signal x(t) within the $i^{th}$ spectral slice of the range [0,1/T]. Thus, spectral slices having little or no energy will be translated to elements of x(f) that are substantially equal to zero.

In principle, the CTF process attempts to identify a subset of the elements of x(f), which contain non-negligible spectral density (referred to herein as non-zero elements for clarity). The set of indices of the non-zero elements of x(f) is referred to as the diversity set of x(f), and is given by $$S = \bigcup_{f \in F_0} I(x(f)) \quad [7]$$

wherein I(x(f)) denotes the set of non-zero indices of x(f). For example, in the vector x(f) shown in FIG. 3 the diversity set is S={0, 1, 2, 3, 5}.

Since the locations of the signal bands are not known a-priori, S is automatically determined from the sampled signal y(f). Exemplary methods for determining S are described further below. Once S is known, Equation [4] can be rewritten by restricting x(f) to its non-zero elements, and restricting matrix A to include only the columns that multiply the non-zero elements of vector x(f):

$$y(f) = A_S x^S(f) \quad [8]$$

wherein $A_S$ denotes the column restriction of A (i.e., a matrix that includes only the columns whose indices are in set S) and $x^S$ denotes the row restriction of x (i.e., a vector that includes only the elements whose indices are in S).

If the diversity set S satisfies the condition $$|S| \leq \sigma(A) \quad [9]$$

(wherein $\sigma(A)$ denotes the well-known Kruskal rank of A, defined as the largest number q such that every set of q columns of A is linearly-independent) then $$(A_S)^+ A_S = I \quad [10]$$

wherein $( )^+$ denotes the Penrose-Moore pseudo-inverse of the matrix, and I denotes the identity matrix. Matrix $A_S$ has p rows and |S| columns. Thus, Equation [8] can be written as $$x^S(f) = (A_S)^+ y(f), \forall f \in F_0 \quad [11]$$
$$x_i(f) = 0, \forall f \in F_0, i \notin S$$

Thus, once S is known, and as long as the condition in Equation [9] holds, equation [11] provides the reconstruction of x(f) from y(f).

Meeting the condition of Equation [9] depends on the sampling configuration, i.e., on the choice of L, p and the sampling patterns C. For example, some sampling patterns, which are referred to as universal patterns, produce matrices A for which $\sigma(A) = p$. It has been shown by the inventors that choosing $L \leq 1/BT$, $p \geq 2N$ and a universal sampling pattern C ensures that the condition in Equation [9] is met for any signal $x(t) \in M$. In other words, when L, p and C meet the conditions above, Equation [4] above has a single unique solution. It can be shown that if $L \leq 1/BT$, $p \geq 2N$ and C is a universal pattern then a unique solution exists (i.e., reconstruction is possible) for any signal $x(t) \in M$.

Selecting a universal pattern is a task that typically has combinatorial complexity. Various kinds of universal sampling patterns are known in the art and appear in the compressed sensing literature. A specific example of a universal sampling pattern is described in the paper by Venkataramani and Bresler, cited above. In particular, it can be shown that choosing L to be a prime number ensures that the sampling pattern is universal. Nevertheless, the methods and systems described herein are not limited to the use of universal patterns.

Note, however, that the universality of the sampling pattern is not a necessary condition, but only a sufficient condition. In many practical cases, the methods and systems described herein achieve high quality sampling and reconstruction of a wide variety of signal types for non-universal patterns, as well. Selecting sampling patterns at random often produces patterns that are very close to being universal. Moreover, the quality of an arbitrary sampling pattern can be tested before it is used.

Figure 4:
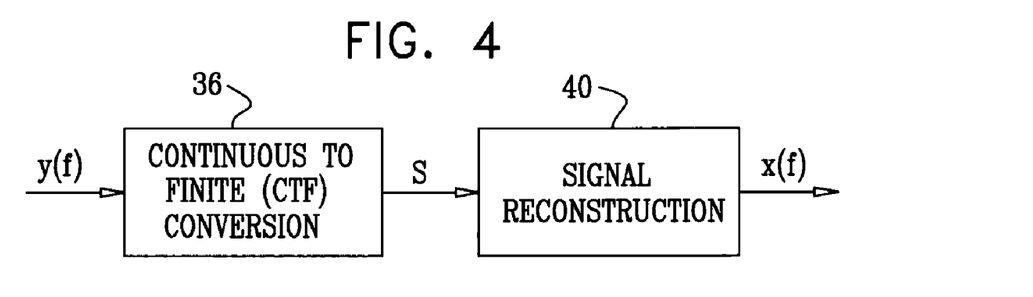
FIG. 4 is a block diagram that schematically illustrates a scheme for blind sampling and reconstruction of multi-band signals, in accordance with an embodiment of the present invention.

FIG. 4 is a block diagram that schematically illustrates a scheme for blind sampling and reconstruction of multi-band signals, in accordance with an embodiment of the present invention. In FIG. 4, the sampled signal y(f) is provided to a CTF conversion module 36. Module 36 applies a CTF process, which is described in detail in FIGS. 5 and 6 below, to determine the diversity set S. A signal reconstruction module 40 reconstructs signal x(f) from the sampled signal y(f), such as using Equation [11] above.

Figure 9:
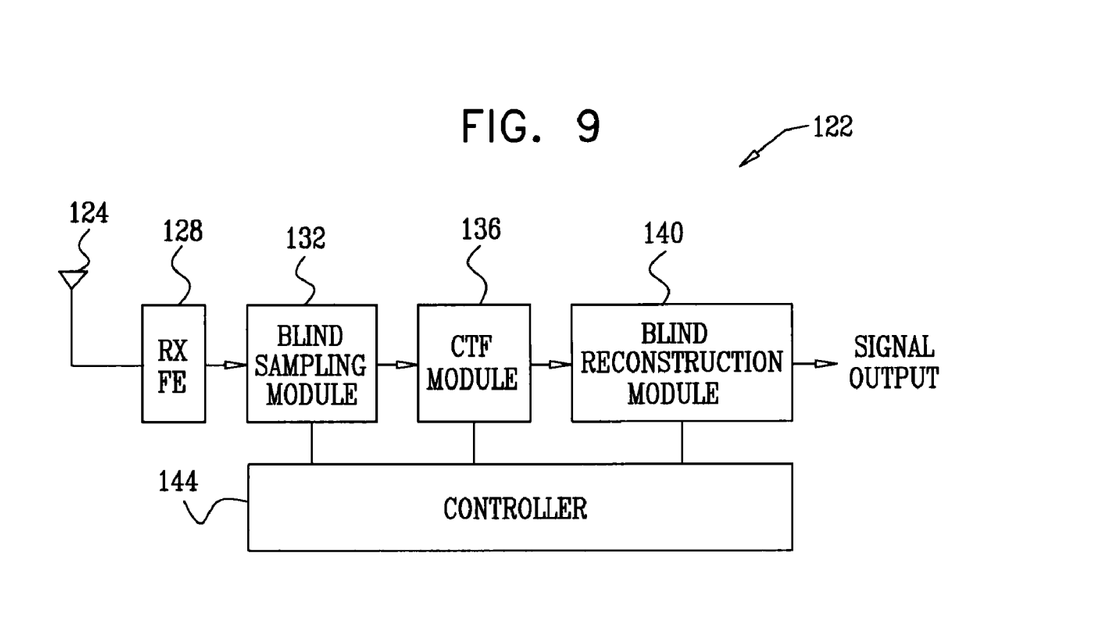
FIG. 9 is a block diagram that schematically illustrates a receiver for receiving multi-band signals, in accordance with an embodiment of the present invention.

The CTF conversion module and the signal reconstruction module may be implemented as part of a receiver, which receives the analog signal x(t) and extracts the information conveyed by the signal. An exemplary receiver configuration is shown in FIG. 9 below. Modules 36 and 40 may be implemented in software running on a suitable processor, such as a Digital Signal Processor (DSP) device. In some embodiments, the processor comprises a general-purpose processor, which is programmed in software to carry out the functions described herein. The software may be downloaded to the processor in electronic form, over a network, for example, or it may alternatively be supplied to the processor on tangible media.

Alternatively, modules 36 and 40 may be implemented in hardware, such as using one or more Application-Specific Integrated Circuits (ASIC), Field-Programmable Gate Arrays (FPGA), and/or using suitable optical processing components. Further alternatively, the CTF and reconstruction modules can be implemented using a combination of hardware and software elements.

Continuous-To-Final (CTF) Conversion

As noted above, the problem of extracting x(f) from y(f) according to Equation [4] comprises an infinite number of linear systems because of the continuous variable f. Moreover, the definition of the diversity set S given in Equation [7] involves a union over this continuous variable. The description that follows provides several processes for reducing this problem to a finite one, i.e., for determining the diversity set S.

Figure 5:
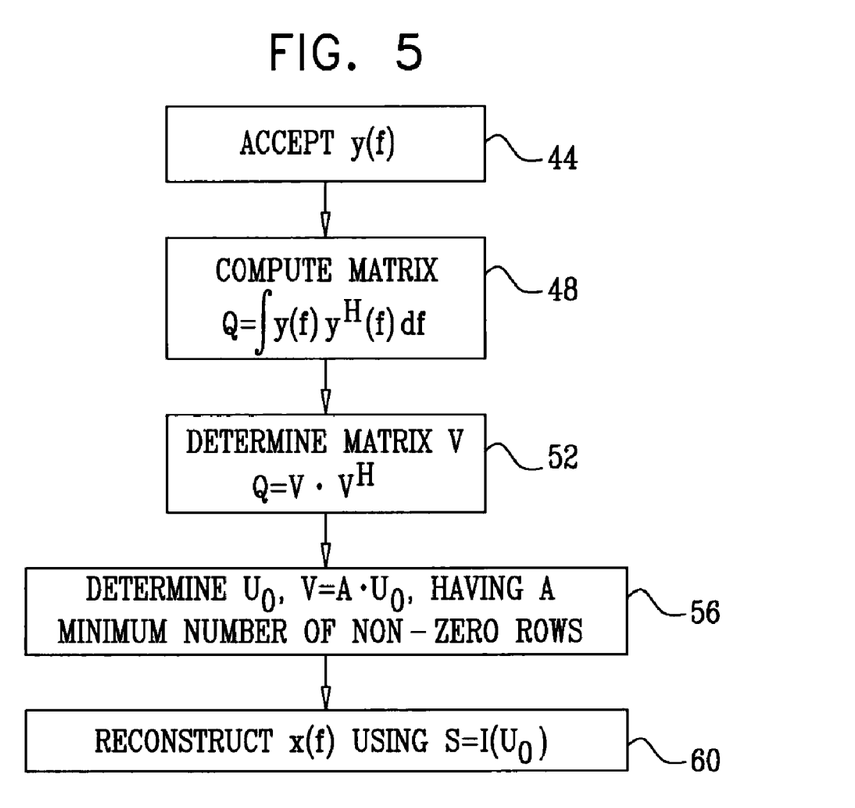
FIGS. 5 and 6 are flow charts that schematically illustrate methods for blind sampling and reconstruction of multi-band signals, in accordance with embodiments of the present invention.

FIG. 5 is a flow chart that schematically illustrates a method for blind sampling and reconstruction of multi-band signals, in accordance with an embodiment of the present invention. The method begins with signal reconstruction module 36 accepting a sampled multi-band signal x(t), which corresponds to a frequency domain vector y(f) as described above, at an input step 44. The signal x(t) is sampled without a-priori knowledge of the locations of the signal bands, using a choice of L, p and C that enable reconstruction, as described above.

Module 36 computes a p-by-p matrix denoted Q, at a Q matrix calculation step 48. Matrix Q is defined as $$Q = \int_0^{1/LT} y(f) y^H(f) df \qquad [12]$$

wherein $y^H(f)$ denotes the conjugate transpose of y(f).

Using the matrix Q, module 40 computes a matrix denoted V, at a decomposition step 52. Matrix V is given by $$Q = V \cdot V^H \qquad [13]$$

Matrix V is a p-by-r matrix, wherein r denotes the rank of matrix Q. Matrix V can be derived from matrix Q using any suitable decomposition method known in the art.

In some embodiments, module 36 applies pre-processing to matrix Q before decomposing it. For example, when the sampled signal has noise content, it is often advantageous to set a threshold on the eigenvalues of Q, and zero out the eigenvalues that are smaller than the threshold.

Using matrix V, module 36 calculates the sparsest solution of the Equation $$V = AU, \qquad [14]$$

denoted $U_0$, at a $U_0$ calculation step 56. It can be shown that if $|S| \leq p/2$ then there exists a single sparsest solution for U, i.e., a matrix $U_0$ having a minimum number of non-zero rows. It can also be shown that $I(U_0)$, i.e., the indices of the non-zero rows of $U_0$, are the desired diversity set S.

Module 36 may use any suitable method for computing the sparsest solution of Equation [14]. For example, module 36 may apply methods that are known in the art as Multiple Measurement Vector (MMV) methods. MMV methods are described, for example, by Chen and Huo in "Theoretical Results on Sparse Representations of Multiple Measurement Vectors," IEEE Transactions on Signal Processing, volume 54, December, 2006, pages 4634-4643, by Cotter et al., in "Sparse Solutions to Linear Inverse Problems with Multiple Measurement Vectors," IEEE Transactions on Signal Processing, volume 53, July, 2005, pages 2477-2488, by Chen and Donoho in "Basis Pursuit," Proceedings of the Twenty-Eighth Asilomar Conference on Signals, Systems and Computers, Monterey, Calif., November, 1994, volume 1, pages 41-44, and by Mallat and Zhang in "Matching Pursuits with Time-Frequency Dictionaries," IEEE Transactions on Signal Processing, volume 41, number 12, pages 3397-3415, which are incorporated herein by reference. Any suitable MMV method, such as the methods cited above, may be used for this purpose.

Having determined the diversity set S, signal reconstruction module 40 reconstructs signal x(f), at a reconstruction step 60. For example, module 40 may reconstruct the signal using Equation [11] above. Note that both sampling and reconstruction operations described herein are carried out without a-priori knowledge of the frequencies of the signal bands.

Spectrum-Blind Reconstruction (SBR) Methods

The reconstruction method described in FIG. 5 above is referred to herein as SBR4. The SBR4 method can also be represented by the following pseudo-code:

| METHOD SBR4 |
| --- |
| Input: y(f), Assume: σ(A)=p |
| Output: The set S, Flag |
| 1: Set T=$F_0$ |
| 2: Compute matrix Q using Equation [12] |
| 3: Decompose Q=V·$V^H$ |
| 4: Solve the MMV system V=AU to find the sparsest solution $U_0$ |
| 5: S=I($U_0$) |
| 6: Flag={|S|≦p/2} |
| 7: Return S, Flag |

Steps 6 and 7 of the pseudo-code compute and return a flag, which indicates whether the single sparsest solution for U was found. The single sparsest solution may not be found, for example, when the solution of the MMV system is only approximate or fails. Some iterative MMV solving methods terminate upon reaching a pre-determined number of iterations, in which case the flag may not be reliable. The flag is reliable and can be used, for example, with MMV methods that terminate based on convergence-related conditions (e.g., upon reaching a certain residual error).

When using the SBR4 method, the matrix Q can be computed in time-domain from the known sequences $x_{c_i}[n]$, $1 \leq i \leq p$. The computation may be carried out by a set of digital filters that do not depend on the signal and can therefore be designed in advance. An exemplary filter configuration is described further below.

When the number of non-zero elements of x(f) is K, it can be shown that the signal can be reconstructed using the SBR4 method using an average sampling rate of 2K/LT. Generally, however, the value of K is not known. An equivalent condition that is based on the known signal characteristics can be used instead. It can be shown that the SBR4 method enables perfect signal reconstruction when $L \leq 1/BT$ and $p \geq 4N$. The minimal sampling rate under this condition is p/LT=4NB.

It can be shown, however, that a unique sparsest solution for U exists for $p \geq 2N$, which implies a minimal sampling rate that is half the rate achieved by the SBR4 method. An alternative reconstruction method denoted SBR2, which is described below, achieves this lower sampling rate at the expense of higher complexity with respect to the SBR4 method.

The SBR2 method is described by the following pseudo-code:

METHOD SBR2

Input: T, Initialize: T=F$_0$, Assume: σ(A)=p
Output: A set Ŝ
1:   If λ(T)≦ε then
2:       Return Ŝ={ }
3:   End if
4:   Compute matrix Q using Equation [12]
5:   If rank(Q)≦p/2 then
6:       Decompose Q=V·V$^H$
7:       Solve the MMV system V=AU to find the
          sparsest solution U$_0$
8:       Ŝ=I(U$_0$)
9:   Else
10:      Ŝ={ }
11:  Endif
12:  If (rank(Q)>p/2) or (|Ŝ|>p/2) then
13:      Split T into equal-width intervals T$_1$, T$_2$
14:      Ŝ$^{(1)}$=SBR2(T$_1$)
15:      Ŝ$^{(2)}$=SBR2(T$_2$)

The SBR2 method is recursive. Matrix Q is first calculated, similarly to the calculation performed in the SBR4 method. If the rank of matrix Q is smaller than p/2 (implying a single sparsest solution for U exists), Q is decomposed and the MMV system is solved similarly to the SBR4 method. If the rank of Q indicates that a single sparsest solution for U does not exist, the interval T is split into two sub-intervals denoted T$_1$ and T$_2$. The SBR2 method is invoked recursively for each of the two sub-intervals, to produce diversity sets Ŝ$^{(1)}$ and Ŝ$^{(2)}$. The overall diversity set Ŝ is computed as the union of Ŝ$^{(1)}$ and Ŝ$^{(2)}$.

In alternative embodiments, the matrix Q is computed over the entire sampling interval, and the splitting into sub-intervals is carried out only mathematically. In other words, a set of matrices Q$_i$ are found, such that Q=sum(Q$_i$) and each Q$_i$ has an appropriate rank. The CTF module uses each Q$_i$ to determine a set of indices, and the union of all indices gives the desired set S.

Figure 7:
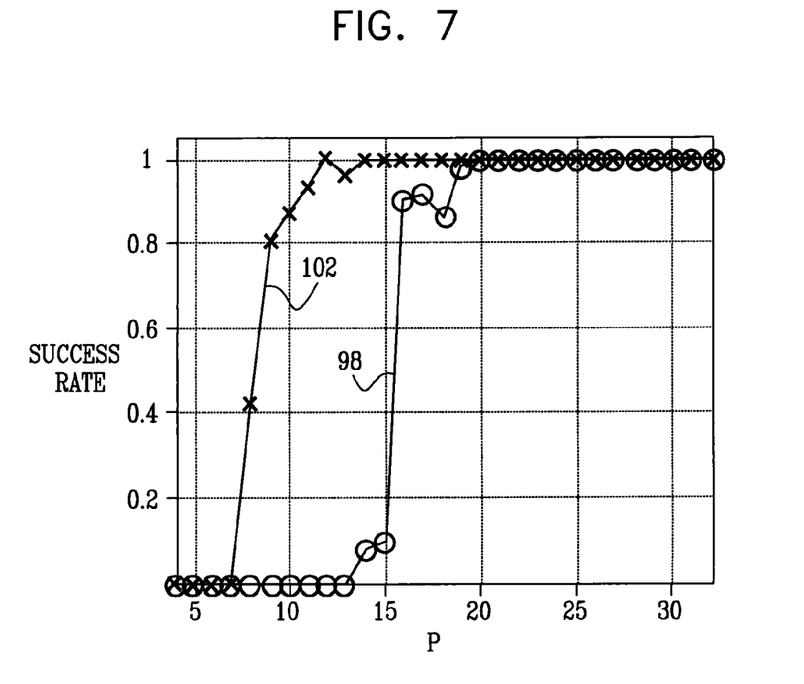
FIGS. 7 and 8 are graphs showing simulated test results of methods for blind sampling and reconstruction of multi-band signals, in accordance with embodiments of the present invention.
Figure 8:
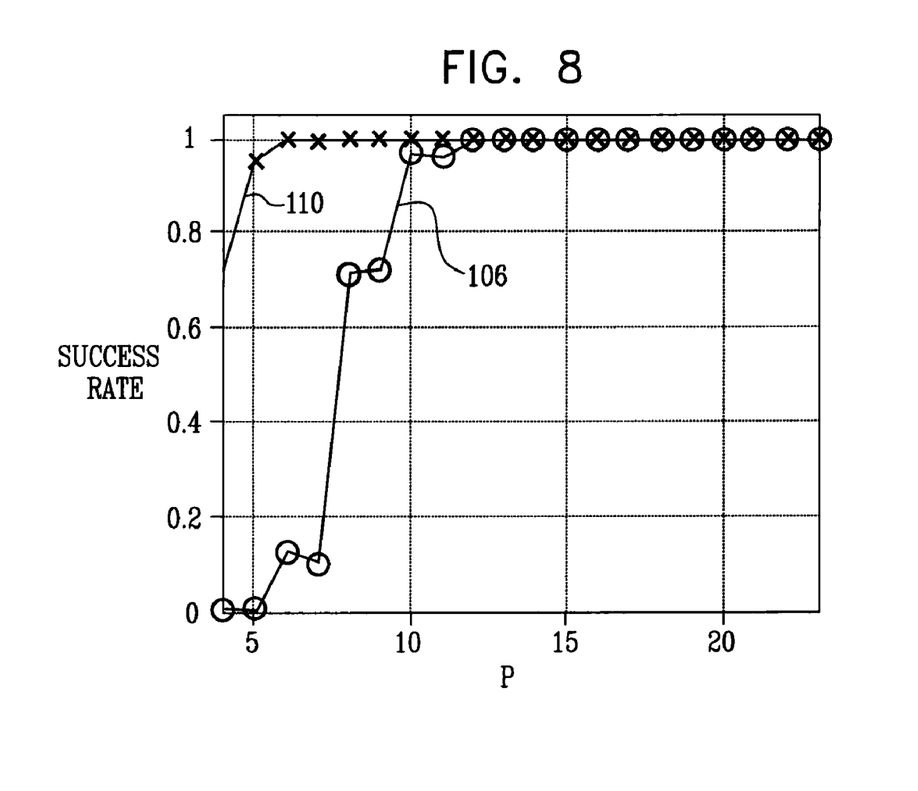

The complexity of the SBR2 method depends on the number of iterations, i.e., on the number of times the interval T is bisected. The number of iterations often depends on the behavior of the MMV solving process that is used at step 7 of the pseudo-code. Exemplary simulated test results are shown in FIGS. 7 and 8 below.

Thus, given certain signal parameters (N, B, T) and certain sampling parameters (L, C and p), the appropriate sampling and reconstruction method can be selected, such as using the scheme of FIG. 6 below. Note that the SBR2 and SBR4 methods represent exemplary trade-offs between complexity and sampling rate. Alternatively, other suitable methods can also be used.

Figure 6:
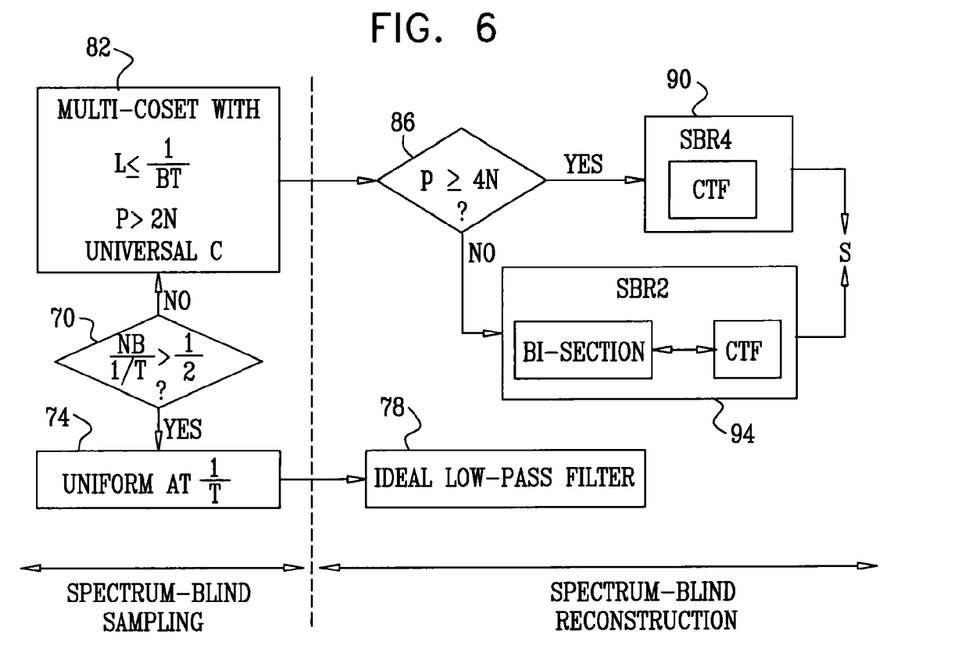

FIG. 6 is a flow chart that schematically illustrates a method for blind sampling and reconstruction of multi-band signals, which selects an appropriate sampling and reconstruction method for a given set of signal and sampling parameters, in accordance with an embodiment of the present invention. The method can be carried out, for example, by a controller of a receiver that is to sample and reconstruct a received signal, such as the receiver shown in FIG. 9 below.

The method begins with the controller checking whether $$\frac{NB}{1/T} > \frac{1}{2},$$

at a first checking step 70. If the condition is met, i.e., if the signal bands occupy more than 50% of the total bandwidth, the receiver samples the signal using uniform sampling at the Nyquist rate of 1/T, at a uniform sampling step 74. The receiver then reconstructs the signal, such as using a Low-Pass Filter (LPF), at a Nyquist reconstruction step 78.

If, on the other hand, the signal bands occupy less than 50% of the total bandwidth (as is typical of many multi-band signal scenarios and applications), the receiver samples the signal using multi-coset sampling, at a multi-coset sampling step 82. The sampling pattern C used by the receiver is chosen so that the pattern is universal, L≦1/BT and p>2N.

The controller then checks whether p≧4N, at a second checking step 86. If p≧4N, the receiver reconstructs the signal using the SBR4 method to produce S, at an SBR4 reconstruction step 90. The minimal sampling rate in this case is 4NB.

Otherwise, i.e., if p<4N, the receiver reconstructs the signal using the SBR2 method in an iterative process of bi-sectioning and CTF, at an SBR2 reconstruction step 90. The minimal sampling rate in this case is 2NB.

Experimental Results

The description that follows presents exemplary simulated test results of the SBR4 and SBR2 methods. The simulated signals lie in the range 0-20 GHz, have up to N=4 bands having a maximum bandwidth of B=100 MHz. Each simulation run generated 1000 test signals at random. For each test case, the simulation first generated random band edge frequencies, in a uniform distribution across the frequency range, and ensured that the bands do not overlap. Then, the simulation generated a spectrum that is confined to the bands. The spectral density within the bands was a complex random variable having a two-dimensional orthogonal Gaussian distribution having zero mean and unit variance. The energy per band was uniformly-distributed in the range 1-5.

In the present example, the minimal achievable sampling rate is 2NB=800 MHz. Various sampling and reconstruction configurations were simulated. For a given simulation run, L was kept constant and p was varied from p=N=4 to p=8N=32. L was chosen to be a prime number, so that the sampling pattern is guaranteed to be universal. Each simulated signal was processed by both the SBR4 and SBR2 methods. The MMV system was solved by a Multi-Orthogonal Matching Pursuit (M-OMP) method, as described in the article by Cotter et al., cited above. The empirical success rate of each method (defined as the relative number of simulation runs in which S was recovered correctly) was evaluated as a function of p.

FIGS. 7 and 8 are graphs showing simulated test results of methods for blind sampling and reconstruction of multi-band signals, in accordance with embodiments of the present invention.

FIG. 7 shows the empirical success rate as a function of p for L=199. A curve 98 shows the performance of the SBR4 method, and a curve 102 shows the performance of the SBR2 method. For p<8 (p<2N), neither method was able to recover S reliably, since the sampling rate was too low. As expected, the SBR2 method outperformed the SBR4 method, achieving high success rates for lower values of p (lower sampling rates). The SBR2 method began to provide high success rates at approximately p=2.6N, which is slightly higher than p=2N. The difference is at least partly due to the performance of the M-OMP MMV solving method. The SBR4 method began to provide high success rates at approximately p=4N.

FIG. 8 shows the empirical success rate as a function of p for L=23. A curve 106 shows the performance of the SBR4 method, and a curve 110 shows the performance of the SBR2 method. The simulation also shows that the disclosed methods provide high-quality reconstruction for p and L values that are chosen beyond the limits of $p \geq 4N$ and $L \leq 1/BT$, since these limitations are only sufficient conditions. In practice, the methods described herein often produce reliable results as long as the average sampling rate p/LT is no less than 2NB, which is also shown to be the minimal sampling rate.

The computation complexity of the SBR2 and SBR4 methods was simulated by measuring the simulation run times. The absolute run times depend on the specific computer configuration used for the simulation, however the relative differences in run time are indicative of the substantial difference in computational complexity of the different methods and scenarios. Exemplary run times (in seconds) are given in the following table:

|        | L = 199 |       | L = 23 |       |
|--------|---------|-------|--------|-------|
|        | SBR4    | SBR2  | SBR4   | SBR2  |
| p = N  | 7       | 608   | 4.2    | 51.4  |
| p = 2N | 16.1    | 1034  | 5.7    | 6.4   |
| p = 4N | 21.4    | 24.8  | 6.7    | 6.7   |

Additional simulation runs were performed for signals that do not lie in M, as well as for sampling patterns that are not universal. These experiments showed that the methods described herein are applicable to a wide variety of signal types and sampling schemes.

Receiver Configuration

FIG. 9 is a block diagram that schematically illustrates a receiver 122 for receiving multi-band signals, in accordance with an embodiment of the present invention. Receiver 122 may apply any of the spectrum-blind methods described herein, such as the methods of FIGS. 5 and 6. In a typical implementation, receiver 122 receives a signal via an antenna 124, and down-converts it to baseband using a receiver front-end (RX FE) 128. A blind sampling module 132 performs spectrum-blind sampling of the received signal, as explained above. A CTF module 136 performs a continuous-to-finite conversion process, which produces the diversity set S. A blind reconstruction module 140 applies spectrum-blind reconstruction provides the reconstructed signal as output. A controller 144 controls the operation of the receiver.

Exemplary Applications

The spectrum-blind sampling and reconstruction methods described herein can be used in a wide variety of applications that involve reception of multi-band signals. For example, receiver 122 may comprise a receiver of a cellular base station, a satellite earth station or of any other communication system that uses multiple frequency channels. The methods described herein can be used for extracting and demodulating multiple communication channels from a certain spectral range, without prior knowledge of the channel frequencies.

For example, receiver 122 may comprise part of a "cognitive radio" system. Cognitive radio systems, as are known in the art, automatically coordinate the allocation of frequency channels by analyzing the spectrum at the receiver. The methods and systems described herein can enable a cognitive radio receiver to analyze the available spectrum with high speed, accuracy and efficiency.

When using the sampling and reconstruction methods described herein in multi-band reception applications (e.g., in a cellular base station), a considerable part of the receiver hardware can be eliminated. In contrast to some known base station receivers, which down-convert each user channel from its frequency to baseband, the methods and systems described herein enable the receiver to receive all channels simultaneously by treating the entire received spectrum as a single, multi-band signal. This multi-band signal is down-converted only once, and the different user signals are reconstructed digitally using the methods described herein.

The methods described herein can also be used in electronics intelligence and reconnaissance systems. In such applications, it is often necessary to receive and process a wide spectrum, which contains multiple target channels (e.g., communication channels or radar signals) whose frequencies are not known a-priori. The methods described herein can identify spectral regions containing spectral activity, and/or reconstruct the signals received in these regions. Yet another reconnaissance-related application is in eavesdropping detection systems. Similar applications can be found in spectrum analysis, spectrum management and spectrum monitoring systems, such as systems deployed by regulatory authorities and wireless communication operators. Fast spectrum analysis is also useful in scanning receivers ("frequency scanners").

The methods and systems described herein are also advantageous when the received signals are stored or recorded for later use. For example, some radio-astronomy applications receive and record multi-band signals that are characterized by (1) unknown band locations and (2) high Nyquist frequencies. In such applications, the methods and systems described herein can considerably reduce the sampling rate of the system and hence the necessary storage volume.

Another application is in systems that perform geophysical mapping by recording the acoustic echoes produced by controlled explosions. Such systems are used, for example, in the detection of oil and other minerals and natural resources. The echoes received by such systems typically have a multi-band structure in which the band locations are not known a-priori, and the signals are often recorded for later analysis. The methods and systems described herein can be used to reduce the sampling rate of the acoustic echo signals and the storage resources needed for recording them. Similar applications can also be found in active and passive seismographic applications.

Some point-to-multipoint communication systems deploy a central receiver, which communicates with multiple end-user devices whose frequency channels may change over time due to various constraints. Such a configuration is common, for example, in various command and control ($C^2$) applications. The methods and systems described herein can significantly reduce the extent and complexity of coordination between the central site and the end-user devices, by enabling the central site receiver to receive and reconstruct the multiple signals without prior knowledge of their frequencies.

Other applications of the methods and systems described herein are in the field of test equipment instrumentation. For example, a spectrum analyzer or similar test equipment may comprise an automatic tuning mode in which the instrument automatically adjusts its settings to match the multi-band signal at its input.

A similar mode can be used in cable television test equipment, e.g., for quick and efficient channel acquisition and analysis. Such a mode can be used not only in test equipment but also in a receiver of a television set or in a tuner of a video recorder. In such receivers, the methods and systems described herein can be used for mapping and/or acquiring the available television channels with high speed, accuracy and efficiency.

The methods described herein can be used in applications commonly known as Fourier imaging applications, for example in the recording of medical imaging signals such as Magnetic resonance Imaging (MRI) signals. When applying the disclosed methods to MRI, the exposure time of a patient to the MRI magnetic fields can be reduced and traded with imaging resolution. In addition, the cost of the MRI imaging system can be reduced. Further alternatively, the disclosed methods can be used in the analysis of radar signals, such as Synthetic Aperture Radar (SAR) signals.

Another application is in the field of speech processing. Speech signals sometimes have a multi-band structure over certain periods of time. Within each such time interval, the speech signal can be sampled and compressed using the methods and systems described herein, so as to directly produce a compressed version of the signal without a-priori knowledge of its spectral content. Applying the methods described herein to a speech signal enables sampling the signal with a low sampling rate, and thus compressing the signal to a small file size, without compromising reconstruction accuracy.

In some embodiments, the methods and systems described herein can be used for sampling and reconstructing signals whose multi-band characteristics are not in the frequency domain but in other domains, such as in time domain of in the spatial domain of an image. For example, some astronomy applications store and process images of the sky with high resolution. The received image in these applications is typically mostly dark, with only few spatial regions (bands) that are of interest. The spatial locations of the bands are not known a-priori. The methods and systems described herein, when applied to such received image signals, can be used to reduce the storage volume required to store the images, as well as for trading off between image size and image quality.

Further alternatively, the methods and systems described herein can be used in any other suitable application involving reception and processing of multi-band signals. In some applications, the desired output is the reconstructed multi-band signal. In other applications, the desired output is an indication of the locations of the signal bands in the spectrum, without necessarily recovering the signal itself.

Real-Valued Signal Representation

Although the description above referred mainly to complex signals, the methods and systems described herein can equivalently sample and reconstruct real-valued multi-band signals in the range $F=[-1/2T, 1/2T]$ having up to N signal bands on each side of the spectrum.

When constructing the elements of vector $x(f)$, the interval F is divided into L slices. In the case of real signals, however, odd and even values of L are given different treatment. Define a set of L successive integers:

$$K = \begin{cases} \{-\frac{L-1}{2}, \ldots, \frac{L-1}{2}\} & \text{odd } L \\ \{-\frac{L}{2}, \ldots, \frac{L}{2}-1\} & \text{even } L \end{cases} \quad [15]$$

Define also the interval $F_0$ $$F_0 = \begin{cases} \left[-\frac{1}{2LT}, \frac{1}{2LT}\right] & \text{odd } L \\ \left[0, \frac{1}{LT}\right] & \text{even } L \end{cases} \quad [16]$$

The vector $x(f)$ is then defined as $$x_i(f) = X(f + K_i/LT) \forall 0 \leq i \leq L-1 \quad [17]$$

The dimensions of matrix A remain p by L, and its elements are given by $$A_{ik} = \frac{1}{LT} \exp\left(j\frac{2\pi}{L} c_i K_k\right) 1 \leq i \leq p, 0 \leq k \leq L-1 \quad [18]$$

Computation of Matrix Q

The matrix Q, which was defined in the frequency domain in Equation [12] above, can be equivalently represented in the time domain using a set of digital filters. The elements of Q can be written as $$Q_{ik} = \sum_{n_i \in Z} \sum_{n_k \in Z} x_{c_i}[n_i] x_{c_k}^*[n_k] \int_0^{1/LT} \exp(j2\pi f(n_k - n_i)T) df \quad [19]$$

Recall that the sequence $x_{c_i}[n_i]$ is padded with L−1 zeros between the non-zero samples. A diluted sequence having only the non-zero elements can be written as $$\hat{x}_{c_i}[m] = x(mLT + c_i T) m \in Z, 1 \leq i \leq p \quad [20]$$

Equation [19] can be written as $$Q_{ik} = \sum_{m_i \in Z} \hat{x}_{c_i}[m_i](\hat{x}_{c_k} * g_{ik})[m_i] \quad [21]$$

wherein $$g_{ik}[m] = \int_0^{1/LT} \exp(j2\pi f(mL + (c_k - c_i))T) df \quad [22]$$

and $$(\hat{x}_{c_k} * g_{ik})[m] = \sum_{n \in Z} \hat{x}_{c_k}^*[n] g_{ik}[m-n] \quad [23]$$

If $i = k$ then $c_i = c_k$ and $$g_{ii}[m] = g[m] = \frac{1}{LT} \exp(j\pi m) \mathrm{sinc}(m) \quad [24]$$

wherein $\sin c(x) = \sin(\pi x)/(\pi x)$. If $i \neq k$, then $$g_{ik}[m] = \frac{\exp\left(j\frac{2\pi}{L}(c_k - c_i)\right) - 1}{j2\pi(mL + (c_k - c_i))T} \quad [25]$$

The set $g_{ik}[m]$ represent the desired filter coefficients.

The CTF module (e.g., module 36 in FIG. 4 or module 136 in FIG. 9) may comprise digital filters whose coefficients are determined using this technique. Since the coefficients do not depend on the signal, they can be designed in advance for a given selection of L, p and C.

In an alternative embodiment, the CTF module may compute the matrix $$\tilde{Q}_{ik} = \sum_{n=-\infty}^{+\infty} x_i[n](x_k[n])^* \quad [26]$$

and use this matrix in the calculation of S. Matrix $\tilde{Q}_{ik}$ is computed directly from the samples of the time-domain signal x, thus avoiding the use of digital filters. In some embodiments, such as for real-time applications, the computation of $\tilde{Q}_{ik}$ can be approximated by summing over finite intervals.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A signal processing method, comprising:
sampling an analog signal, which has a spectral density defining one or more bands, to produce a digitized signal;
expressing a spectral transform of the digitized signal as a matrix multiplied by a vector, wherein the vector comprises multiple elements that represent the spectral density of the analog signal as a function of frequency within respective spectral slices;
determining indices of a subset of the elements of the vector in which the spectral density is concentrated; and
reconstructing the analog signal from the digitized signal using the subset of the elements of the vector and a corresponding subset of columns of the matrix having the indices.

2. The method according to claim 1, wherein sampling and reconstructing the analog signal are carried out irrespective of frequencies of the one or more bands.

3. The method according to claim 1, wherein sampling the analog signal comprises sampling the signal using a periodic, non-uniform sampling pattern.

4. The method according to claim 1, wherein determining the indices comprises:
integrating the spectral transform of the digitized signal multiplied by a complex conjugate of the spectral transform, to produce an integrated matrix;
decomposing the integrated matrix;
expressing the decomposed integrated matrix as the matrix multiplied by another matrix;
determining a sparsest solution of the another matrix; and
extracting the indices of the sparsest solution to serve as the indices of the subset of the elements of the vector.

5. The method according to claim 4, wherein determining the sparsest solution comprises applying a Multiple Measurement Vector (MMV) process.

6. The method according to claim 4, wherein determining the indices comprises determining an indication that the sparsest solution could not be found and, responsively to the indication, splitting a sampling interval used for sampling the analog signal into sub-intervals, determining the indices separately within each of the sub-intervals, and combining the indices determined within each of the sub-intervals to produce the indices.

7. The method according to claim 4, wherein determining the indices comprises determining a set of components such that a sum of the components produces the integrated matrix, determining the indices separately for each of the components, and combining the indices determined for each of the components to produce the indices.

8. The method according to claim 4, wherein integrating the spectral transform comprises defining a set of digital filters, and filtering the digitized signal using the set of the digital filters to produce the integrated matrix.

9. The method according to claim 4, wherein integrating the spectral transform comprises directly processing the digitized signal to produce the integrated matrix.

10. The method according to claim 4, and comprising pre-processing the integrated matrix prior to decomposing the integrated matrix.

11. The method according to claim 1, wherein reconstructing the analog signal comprises determining and outputting frequencies of the one or more bands.

12. The method according to claim 1, wherein the analog signal comprises a communication signal carrying multiple communication channels, and wherein reconstructing the analog signal comprises decoding the communication channels.

13. The method according to claim 1, wherein the analog signal comprises one of a radar signal and a medical imaging signal.

14. The method according to claim 1, wherein the analog signal comprises one of a radio signal, an acoustic echo signal, a speech signal and an image signal.

15. The method according to claim 1, and comprising recording the digitized signal for later use, and wherein reconstructing the analog signal comprises processing the recorded digitized signal.

16. A signal processing apparatus, comprising:
a sampling module, which is coupled to sample an analog signal, which has a spectral density defining one or more bands, to produce a digitized signal; and
a reconstruction module, which is coupled to express a spectral transform of the digitized signal as a matrix multiplied by a vector, wherein the vector comprises multiple elements that represent the spectral density of the analog signal as a function of frequency within respective spectral slices, to determine indices of a subset of the elements of the vector in which the spectral density is concentrated, and to reconstruct the analog signal from the digitized signal using the subset of the elements of the vector and a corresponding subset of columns of the matrix having the indices.

17. The apparatus according to claim 16, wherein the sampling module and the reconstructing module are coupled to sample and reconstruct the analog signal irrespective of frequencies of the one or more bands.

18. The apparatus according to claim 16, wherein the sampling module is coupled to sample the signal using a periodic, non-uniform sampling pattern.

19. The apparatus according to claim 16, wherein the reconstruction module is coupled to integrate the spectral transform of the digitized signal multiplied by a complex conjugate of the spectral transform to produce an integrated matrix, to decompose the integrated matrix, to express the decomposed integrated matrix as the matrix multiplied by another matrix, to determine a sparsest solution of the another matrix, and to extract the indices of the sparsest solution to serve as the indices of the subset of the elements of the vector.

20. The apparatus according to claim 19, wherein the reconstruction module is coupled to apply a Multiple Measurement Vector (MMV) process so as to determine the sparsest solution.

21. The apparatus according to claim 19, wherein the reconstruction module is coupled to determine an indication that the sparsest solution could not be found and, responsively to the indication, to split a sampling interval used for sampling the analog signal into sub-intervals, to determine the indices separately within each of the sub-intervals, and to combine the indices determined within each of the sub-intervals to produce the indices of the subset of the elements of the vector.

22. The apparatus according to claim 19, wherein the reconstruction module is coupled to determine a set of components such that a sum of the components produces the integrated matrix, to determine the indices separately for each of the components, and to combine the indices determined for each of the components to produce the indices of the subset of the elements of the vector.

23. The apparatus according to claim 19, wherein the reconstruction module comprises a set of digital filters, and is coupled to integrate the spectral transform by filtering the digitized signal using the set of the digital filters.

24. The apparatus according to claim 19, wherein the reconstruction module is coupled to directly process the digitized signal to produce the integrated matrix.

25. The apparatus according to claim 19, wherein the reconstruction module is coupled pre-process the integrated matrix prior to decomposing the integrated matrix.

26. The apparatus according to claim 16, wherein the reconstruction module is coupled to determine and output frequencies of the one or more bands.

27. The apparatus according to claim 16, wherein the analog signal comprises a communication signal carrying multiple communication channels, and wherein the reconstruction module is coupled to decode the communication channels.

28. The apparatus according to claim 16, wherein the analog signal comprises one of a radar signal and a medical imaging signal.

29. The apparatus according to claim 16, wherein the analog signal comprises one of a radio signal, an acoustic echo signal, a speech signal and an image signal.

30. The apparatus according to claim 16, wherein the sampling module is coupled to record the digitized signal for later use, and wherein the reconstruction module is coupled to reconstruct the analog signal by processing the recorded digitized signal.

31. A computer software product for signal processing, the product comprising a tangible non-transitory computer-readable medium, in which program instructions are stored, which instructions, when read by a processor, cause the processor to sample an analog signal, which has a spectral density defining one or more bands, so as to produce a digitized signal, to express a spectral transform of the digitized signal as a matrix multiplied by a vector, wherein the vector comprises multiple elements that represent the spectral density of the analog signal as a function of frequency within respective spectral slices, to determine indices of a subset of the elements of the vector in which the spectral density is concentrated, and to reconstruct the analog signal from the digitized signal using the subset of the elements of the vector and a corresponding subset of columns of the matrix having the indices.

* * * * *